(12) United States Patent
Plank et al.

(10) Patent No.: US 7,547,459 B2
(45) Date of Patent: *Jun. 16, 2009

(54) REDUCED TRANS FAT PRODUCT

(75) Inventors: David W. Plank, Taylors Falls, MN (US); Anthony J. Delvecchio, Allentown, PA (US)

(73) Assignee: General Mills, Inc., Minneapolis, MN (US)

( * ) Notice: Subject to any disclaimer, the term of this patent is extended or adjusted under 35 U.S.C. 154(b) by 262 days.

This patent is subject to a terminal disclaimer.

(21) Appl. No.: 11/167,002

(22) Filed: Jun. 24, 2005

(65) Prior Publication Data

US 2005/0233054 A1    Oct. 20, 2005

Related U.S. Application Data

(63) Continuation of application No. 10/627,427, filed on Jul. 25, 2003, now Pat. No. 7,105,195.

(51) Int. Cl.
A23D 9/00    (2006.01)
(52) U.S. Cl. ...................... 426/601; 426/607
(58) Field of Classification Search ............... 426/601
See application file for complete search history.

(56) References Cited

U.S. PATENT DOCUMENTS

| | | | |
|---|---|---|---|
| 3,923,598 A | 12/1975 | Horikoshi | |
| 4,135,977 A | 1/1979 | Horikoahi et al. | |
| 4,396,602 A | 8/1983 | Endo | |
| 4,859,590 A | 8/1989 | Thiem et al. | |
| 4,877,778 A | 10/1989 | Carpenter et al. | |
| 4,978,532 A | 12/1990 | El-Rashidy | |
| 5,063,077 A | 11/1991 | Vollbrecht et al. | |
| 5,223,295 A | 6/1993 | Maffrand et al. | |
| 5,232,725 A | 8/1993 | Roderbourg et al. | |
| 5,342,633 A | 8/1994 | Cully et al. | |
| 5,498,437 A | 3/1996 | Kohlrausch et al. | |
| 5,624,940 A | 4/1997 | Bryant et al. | |
| 6,025,510 A | 2/2000 | Wimmer et al. | |
| 6,638,557 B2 | 10/2003 | Qi et al. | |
| 7,105,195 B2 * | 9/2006 | Plank et al. | 426/601 |
| 2002/0122870 A1 | 9/2002 | McBride et al. | |
| 2003/0114417 A1 | 6/2003 | Takada et al. | |
| 2003/0190402 A1 | 10/2003 | McBride | |
| 2004/0116382 A1 | 6/2004 | Plank et al. | |
| 2004/0161526 A1 | 8/2004 | Schmid et al. | |

FOREIGN PATENT DOCUMENTS

| | | |
|---|---|---|
| DE | 233 926 A1 | 3/1986 |
| DE | 19612658 A1 | 10/1997 |
| EP | 0 284 042 | 9/1988 |
| EP | 0284042 A2 | 9/1988 |
| EP | 02299562 | 12/1990 |
| EP | 1477072 | 11/2004 |
| EP | 1477072 A1 | 11/2004 |
| FR | 2790758 A1 | 9/2000 |
| JP | 53018775 | 2/1978 |
| JP | 55034042 A2 | 3/1980 |
| JP | 58023760 | 2/1983 |
| JP | 60075251 | 4/1985 |
| JP | 60094912 | 5/1985 |
| JP | 62011072 | 1/1987 |
| JP | 5103582 | 4/1993 |
| WO | WO99/59421 | 5/1999 |
| WO | WO 99/63841 | 6/1999 |
| WO | WO 99/59421 | 11/1999 |
| WO | WO 99/63841 | 12/1999 |
| WO | WO 00/53637 | 9/2000 |
| WO | WO 2004/016101 | 2/2004 |
| WO | WO 2004/016101 A2 | 2/2004 |
| WO | WO 2004/054383 A1 | 7/2004 |

OTHER PUBLICATIONS 1 pg. FSTA/IFS, "Development of bread moisture preservers." Yu, L.J.; Meng, Y; Ren, Y.H., Food Industry. 1999. Abstract. 2000-00-m 1595, 2000.
3 pgs. Daniel Swern, "Bailey's Industrial Oil and Fat Products," vol. 1, 4th editor John Wiley & Sons New York 1979, p. 159.
Daniel Swern, 1979 Bailey's Industrial Oil and Fat Products, John Wiley & Sons, NY, p. 159.
XP 002290046, Kaneka Corp, Apr. 27, 1993, JP 5103582 abstract.
XP 002290047, Jintan, Shokuhin, Apr. 27, 1985, JP 60075251 abstract.
XP 002290048, Takeda Chem Jan. 12, 1983, JP 58023760 abstract.
XP 002290049, Takasago Perfumery, Feb. 21, 1978, JP 53018775 abstract.
XP 002290050, Lotte Co, Mar. 10, 1980. JP 55034042 abstract.
XP 002257710, Derwent Jan. 1, 1900, Abstract Only.
XP 002290045, Yu L J, et al. Jan. 1, 1900, Abstract Only.
Derwent XP-002257710, Abstract of RU2039457, Jul. 20, 1995, (1 pg).
European Search Report, Oct. 31, 2008, (4 pgs).

* cited by examiner

Primary Examiner—Carolyn A Paden
(74) Attorney, Agent, or Firm—John A. O'Toole; Doug J. Taylor; Dale Bjorkman

(57) ABSTRACT

The present invention relates to novel uses of cyclodextrins either separately or in combination with beta glucans, to reduce trans fat levels in food products and food intermediates, as well as to enhance the hypocholesterolemic and hypocaloric benefit either individually or synergistically with other components.

20 Claims, 3 Drawing Sheets

REDUCED TRANS FAT PRODUCT

CROSS-REFERENCES TO RELATED APPLICATIONS

This application is a continuation of U.S. patent application Ser. No. 10/627,427 filed Jul. 25, 2003, now U.S. Pat. No. 7,105,195 the entire disclosure of which is incorporated herein by reference.

FIELD OF THE INVENTION

The present invention relates to a method for reducing trans fatty acid levels in food products and food intermediates that are intended for human and animal consumption as well as the food products and food intermediates produced thereby. More specifically, the present invention is directed to the use of alpha-cyclodextrin, beta-cyclodextrin, gamma-cyclodextrin, combinations and modified derivatives thereof in the preparation of fats and oils for use in food products and food intermediates to lower trans fatty acid levels. The food product and food intermediates of the present invention containing such cyclodextrin compounds also provide beneficial hypocholesterolemic and triglyceride-lowering activity through increased bile acid and lipid binding activity. Additionally, cyclodextrin prepared fats have reduced caloric content. The invention is also directed to communicating the benefit of the particular food product.

BACKGROUND OF THE INVENTION

Recent studies have suggested that trans fatty acids in food products and food intermediates may be detrimental to the general health and well being of consumers in that it contributes to obesity and other health related issues.

Trans fatty acids are unsaturated fatty acids in which the hydrogens of a double bond (or unsaturation) are on opposite sides. The trans isomer of the fatty acid causes the carbon chain to assume a straight-chain configuration similar to that of a saturated fat.

Trans fatty acids are primarily formed through the metal-catalyzed process of hydrogenation, however they have also been found to form naturally at low levels in cow's milk.

By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization to the trans configuration.

Partial hydrogenation of fats was introduced into the U.S. food supply beginning in 1910. The practice was put into widespread use in the 1940's in order to make semisolid fat products.

The process of hydrogenation raises the melting point of a fat and increases the solid fat content. The stability of the fat is greatly enhanced through hydrogenation by reducing susceptibility to oxidation and subsequent rancidity. Therefore, positive contributions to shelf-life, texture and taste of food products are imparted by hydrogenated and partially hydrogenated fats.

Some scientific evidence shows that the trans fat that results from partial hydrogenation of oils raises the total cholesterol in humans to a greater extent than saturated fats. Trans fat is known to increase blood levels of low density lipoprotein (LDL), so-called "bad" cholesterol, while lowering levels of high density lipoprotein (HDL), known as "good" cholesterol. The National Academy of Sciences' Institute of Medicine has determined that there is no safe amount of daily consumption of trans fat.

Another significant health concern for humans relates to cholesterol levels, HDL and LDL. Cholesterol in humans is known to come from primarily two sources, the body's own production of cholesterol (endogenous) and dietary cholesterol (exogenous). Lipoproteins contain specific proteins and varying amounts of cholesterol, triglycerides and phospholipids.

Bile acids are synthesized from cholesterol in the liver and then secreted into the intestines. Reducing the level of bile acid reabsorption facilitates the maintenance of a healthy cholesterol level. One method for reducing bile acid reabsorption is achieved by increasing the gut viscosity. Alternatively, a non-digestible dietary component, which binds bile acids secreted in the proximal jejunum, will reduce bile acid reabsorption in the lower intestines (distal ileum). Additionally, a non-digestible dietary component, which binds lipids (e.g. phoshatidyl choline) may disrupt micelles in the small intestine thereby reducing cholesterol and bile acid uptake. The fermentation of this non-digestible dietary component in the cecum may also play a role in lowering cholesterol levels through the production of short-chain fatty acids and through the acidification of the cecum.

There are three major classes of lipoproteins and they include very low-density lipoproteins ("VLDL"), low-density lipoproteins ("LDL") and high-density lipoproteins ("HDL"). The LDLs are believed to carry about 60-70% of the serum cholesterol present in an average adult. The HDLs carry around 20-30% of serum cholesterol with the VLDL having around 1-10% of the cholesterol in the serum. To calculate the level of non-HDL cholesterol present (find the level of LDL or VLDL levels), which indicates risk; the HDL is subtracted from the total cholesterol value.

A focus of the present invention relates to novel uses of cyclodextrins and other component including beta-glucans, to reduce the need for partial hydrogenation of oils by creating thickened fats through formation of cyclodextrin-fat complexes, as well as to enhance the hypocholesterolemic benefit either individually or synergistically with other components.

Cyclodextrins comprise a doughnut shaped or cyclical structure composed of between six to eight alpha-D-glucose units having a hydrophilic exterior (hydrophilic OH groups on the exterior rim) and a hydrophobic interior (electron dense hydrogen and oxygen atoms). Cyclodextrins are generally water soluble, free flowing crystalline powders that are substantially if not completely odorless and white in color.

Cyclodextrins are produced by the action of cyclodextrin glucosyltransferase (CGTase, EC 2.4.1.19) on hydrolysed starch syrups at neutral pH (6.0-7.0) and moderate temperature (35-40° C.). Alternatively, cyclodextrins can be produced in planta by the expression of the gene encoding CGTase in the food plant of interest.

Heretofore, starches such as cyclodextrins have not been employed or known for their hypocholesterolemic activity in humans or for their beneficial reduction of trans fat levels through fat thickening. Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks.

One potential solution to the high cholesterol problem teaches the treatment of the foodstuffs themselves with cyclodextrins rather than the consumer. U.S. Pat. Nos. 5,498,437, 5,342,633 and 5,063,077 discuss various processes for the removal of cholesterol and cholesterol esters from egg yolks, meat, animal fats, etc. It is thought that by reducing the level of cholesterol in such foodstuffs that overall levels of cholesterol may be reduced in consumers. However, processing steps to such foodstuffs increases the cost of delivering such products to market.

Another similar but apparently unrelated reference, which deals with removal of cholesterol from foodstuffs, is U.S. Pat. No. 5,232,725. This reference discusses a process for reducing cholesterol and free fatty acids in an animal fat and the material obtained from that process through the use of cyclodextrins. U.S. Pat. No. 5,223,295 also discusses the use of cyclodextrin to remove steroid based compounds from foodstuffs, particularly egg yolks. However, these patents suffer from the same drawbacks as those referenced above, in that the processing steps required to achieve the result adds another layer to delivering product to the market, causing delay and adding cost.

PCT Publications WO 99/59421 and WO 99/63841 disclose the use of phytosterols as a pharmaceutical agent or as an addition to certain foodstuffs for lowering cholesterol. The publication discusses that greater effectiveness of the phytosterols can be achieved when using a specified delivery vehicle such as a complexation with cyclodextrins. This represents little more than using cyclodextrins for a purpose that they are already known for, as a carrier for sensitive ingredients.

Another reference that teaches the use of beta-cyclodextrin as a carrier or delivery vehicle is U.S. Pat. No. 4,978,532. In this reference, dehydroepiandrosterone (DHEA) is delivered to the patient via a treatment patch. Beta-cyclodextrin is selected from a group of "permeation enhancers" to facilitate the delivery of the DHEA dose to the patient.

U.S. Pat. No. 5,624,940 teaches the use of various complexes including cyclodextrins for reducing bone loss and serum cholesterol levels in mammals. In this reference, the cyclodextrin, specifically hydroxypropyl-beta-cyclodextrin is used as a pharmaceutical delivery agent and not as an active ingredient useful in the reduction of serum cholesterol levels.

U.S. Pat. No. 4,877,778 discusses the administration of doses of 2-hydroxypropyl-beta-cyclodextrin at levels of up to 0.5 gm/kg per day. The cyclodextrin is used as a carrier to remove excess lipophiles from the system, specifically as set forth in the example, reduction of high vitamin A levels. With respect to serum cholesterol levels, the '778 patent suggests that the reduction of serum cholesterol levels achieved in the example is due to the system recognizing an overabundance of cholesterol and the serum cholesterol being subsequently "down-regulated. Such down-regulation is a known biologic phenomenon." The '778 patent goes on to indicate that it is "the natural cholesterol carrying system which predominates and it is the new homeostasis which must be responsible for the observed drop in serum cholesterol." Hence, the '778 patent does not suggest that the cyclodextrin is usable as a mechanism to bind bile acids or lipids to decrease reabsorption in the lower intestines and is merely cumulative of the prior art which illustrates the use of cyclodextrin as a particular pharmaceutical carrier to treat certain disorders.

Beta glucans occur in the bran of grasses (Gramineae) such as barley, oats, rye and wheat, generally in amounts of about 7%, 5%, 2% and less than 1% respectively. Beta glucans consist of linear unbranched polysaccharides of linked beta-(1→3)- and beta-(1→4)-D-glucopyranose units.

Beta glucans are recognized as having important positive health benefits centered around their benefits in coronary heart disease and cholesterol lowering although it may be that some of these effects are due to appetite suppression. High molecular weight beta glucans are viscous due to labile cooperative associations whereas lower molecular weight beta glucans can form soft gels as the chains are easier to rearrange to maximize linkages. Barley beta glucan is highly viscous and pseudoplastic, both properties decreasing with increasing temperature.

Publications, patents and patent applications are referred to throughout this disclosure. All references cited herein are hereby incorporated by reference.

All percentages and ratios are calculated by weight unless otherwise indicated. All percentages and ratios are calculated based on the total composition unless otherwise stated.

BRIEF SUMMARY OF THE INVENTION

Surprisingly, it has been found that through the addition of hydrated cyclodextrins (alpha, beta and/or gamma and/or combinations thereof) or beta-glucan to oil or fat, the oil or fat will gel and thicken. The thickened fat has many of the rheological properties of partially hydrogenated fats and is more resistant to oxidation than the uncomplexed oil or fat.

It has also been found that cyclodextrins incorporated into food products have beneficial hypocholesterolemic and/or caloric properties. Additionally, because alpha and beta cyclodextrin are resistant to digestion in the small intestine, the caloric content of the food is reduced as well.

It has also been found that beta-glucans incorporated into food products have beneficial hypocholesterolemic properties. In addition, it has been discovered that incorporation of cyclodextrins into fat-containing food products or food intermediates whether derived from vegetable or grain, the level of trans fatty acid can be significantly reduced.

In one embodiment of the present invention, fat product having reduced trans fat levels is described and includes, a fat-containing food product or food intermediate that has been derived from grain or vegetable based components or combinations thereof, and an amount of cyclodextrin or beta-glucan ranging from 0.001% to 75% by weight of the food product or food intermediate.

In a further embodiment of the present invention, a method for producing a food product having a reduced trans fat level is described and includes the steps of initially providing one or more ingredients useful in forming a food product. Next, an amount of hydrated cyclodextrin or beta-glucan is added to the one or more ingredients. The food product containing the amount of cyclodextrin is produced in a number of known processes and finally the food product is distributed.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
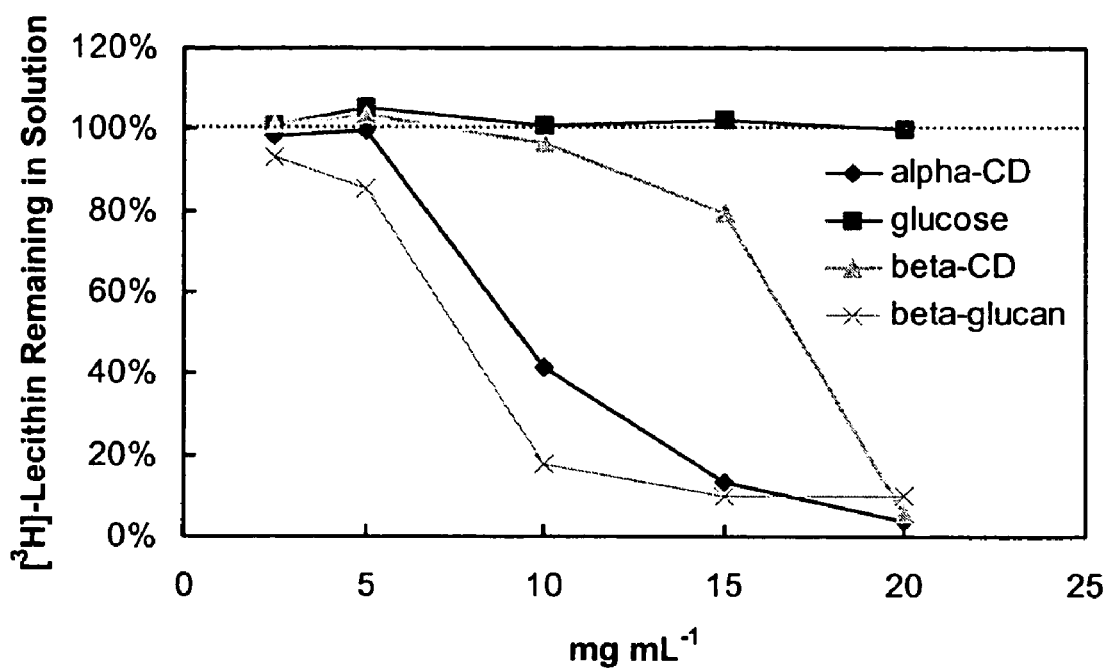
FIG. 1 depicts the precipitation of radiolabeled lecithin by alpha cyclodextrin beta cyclodextrin and beta glucan.
Figure 2:
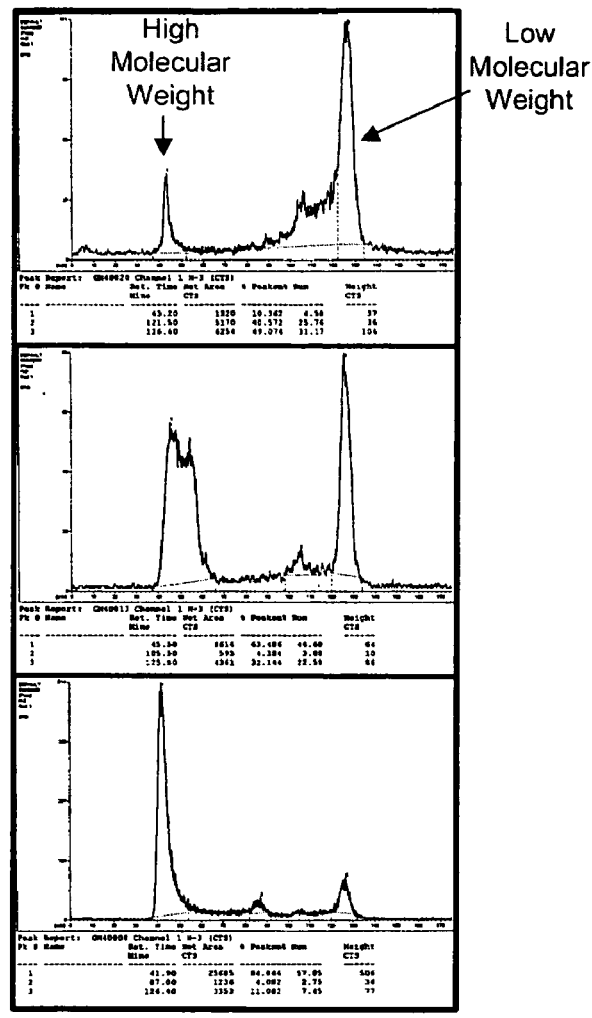
FIG. 2 illustrates the increase in molecular weight of soluble radiolabeled lecithin as a result of binding to beta cyclodextrin or beta glucan.
Figure 3:
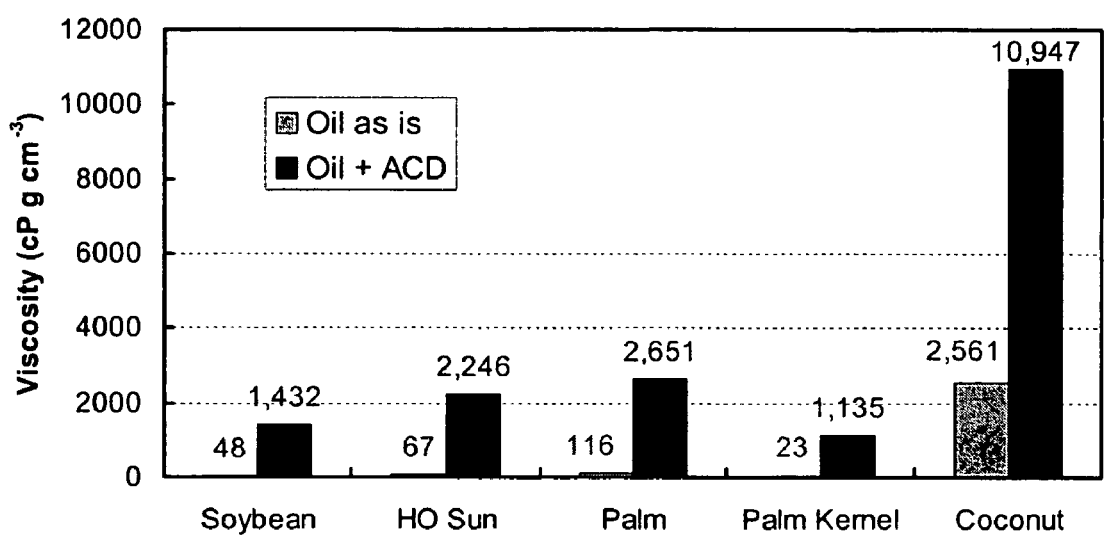
FIG. 3 shows the increase in viscosity of different fats following mixing with hydrated alpha cyclodextrin. Compositions of final fats were 13% water, 10% alpha cyclodextrin and 77% oil.

The present invention is now illustrated in greater detail by way of the following detailed description, but it should be understood that the present invention is not to be construed as being limited thereto.

As used herein a food product and food intermediate may include an additive, component, supplement or ingredient useful in preparing or supplementing a food, or a food intermediate, a fully prepared composition but in a raw state (requiring a further treatment step prior to consumption, such as baking dough to produce bread) or a finished food product that is ready to eat. Food products and food intermediates as provided hereunder generally include any food products or food intermediates derived from or containing grain, cereal or vegetable based components. Food products may also include nutritional beverages and energy drinks.

As used herein a consumable food product provided in a finished state or arising out of an intermediate and includes baked goods, muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice and corn cakes, fried and processed foods and generally any food products or food intermediates derived from or containing grain, cereal or vegetable based components.

The term serving size as used herein varies depending on the product, for example with a ready to eat cereal such as CHEERIOS® available from General Mills, Inc. Minneapolis, Minn. 55426, the serving size may range from 15 to 62 grams, a dairy product such as yogurt may have a serving size of ranging from approximately 30 grams up to 230 grams, snack sizes may range from 30 grams to over a 100 grams.

Inclusion of cyclodextrin-fat complexes or beta glucans-fat complexes in consumable food products, ready to eat (RTE) cereals, mixes, doughs, grain or vegetable based foods and other food products in an amount between 0.01% to 75% by weight, preferably from 1 to 20% by weight is provided. It has been found, that the inclusion of such complexes can reduce the level of trans fats present in such food products or food intermediates as well as can be used to decrease the amount of fat absorption occurring in the gut and thereby reduce total serum cholesterol levels.

Cyclodextrin is a product of enzymatic conversion or degradation of starch in which a cyclic ring of sugars is created containing between 5 to 1,000,000 glucose units and more typically between 6 to 8 glucose units. A principal source of cyclodextrins is maize starch. However, cyclodextrins may be derived from a wide variety of plant starches.

Cyclodextrins are produced by the action of cyclodextrin glucosyltransferase (CGTase, EC 2.4.1.19) on hydrolysed starch syrups at neutral pH (6.0-7.0) and moderate temperature (35-40° C.). Alternatively, cyclodextrins can be produced in planta by the expression of the gene encoding CGTase in the food plant of interest.

The present invention also relates to a food product in which the cyclodextrin is prepared either chemically or enzymatically from derivativse of alpha-cyclodextrin, beta-cyclodextrin, gamma-cyclodextrin and combinations thereof. In addition, the cyclodextrin used in the present invention may be formed in or on the food product by treatment with the enzyme, such as cyclodextrin glucosyltransferase (CGTase, EC 2.4.1.19) or a mutation or modification thereof.

Another means by which to include the cyclodextrin in the food product is through the expression of the gene encoding cyclodextrin glucosyltransferase (CGTase, EC 2.4.1.19) or a mutation or modification thereof, in the grain, cereal or vegetable itself.

While not wishing to be bound to any particular theory, it has been found that by processing oil in the presence of hydrated cyclodextrins (alpha, beta and/or gamma), the fatty acids of the triglycerides in the oil are sequestered in the hydrophobic binding pocket of the cyclodextrin yielding a fat with increased molecular weight and the ability to form intermolecular hydrogen bonds through the hydroxyls on the outside surface of the cyclodextrin ring. The result is a thickened fat with no trans fatty acids, low saturated fatty acids and oxidatively stabilized unsaturated fatty acids.

Also as indicated above, the cyclodextrins with their hydrophobic core can bind cholesterol, bile acids or other components of the micelles (e.g. phoshatidyl choline) and allow these molecules to be excreted from the digestive system in the stool.

One method of preparing cyclodextrins includes enzymatic treatment. Enzymatic degradation or treatment of the starch to produce cyclodextrins useful in the present invention is done through the use of cyclodextrin glucosyltransferase (EC 2.4.1.19) or other enzymes, which results in a cyclic ring of sugar.

Alpha and beta cyclodextrin are resistant to digestion but are susceptible to fermentation by bacteria in the cecum or foregut of the organism. The hydrophobic core serves as binding sites for fatty acids, bile acids and steroids, namely cholesterol and the amino acid asparagine. The bond formed between the cyclodextrin and the amino acid asparagine, bile acids and cholesterol is sufficiently strong so as to enable the material to pass through the system without being reabsorbed through the intestines.

The preferred starches of the present invention are cyclodextrins, preferably alpha-cyclodextrins. As indicated previously, cyclodextrins comprise a doughnut shaped or cyclical structure composed of a number of alpha-D-glucose units (typically 6-8) having a hydrophilic exterior and a hydrophobic interior. Alpha-cyclodextrin is a cyclized ring of six alpha 1,4 linked glucose units.

Cyclodextrins are generally water soluble, although alpha-cyclodextrin is likely more water soluble than beta-cyclodextrin or gamma-cyclodextrin, and free flowing crystalline powders that are substantially if not completely odorless and white in color. Heretofore, modified starches such as cyclodextrin were not employed or known for their hypocholesterolemic or trans fat reducing properties via oil thickening and have been used principally for the encapsulation of insoluble compounds to enhance stability, reduce volatility and alter solubility. Such prior uses of cyclodextrins have been limited to carriers for flavors, therapeutic agents and to remove fatty acids and cholesterol from animal fats.

Alpha-cyclodextrins has a cavity dimension of about 0.50× 0.79 (nm). The solubility of alpha-cyclodextrin at 25° C. is 14 (gm/100 mL). Alpha-cyclodextrin is available from Wacker Specialties, Adrian, Mich. 49221 and sold under the trademark CAVAMAX® W6 Wacker-Chemie, Burghausen, Germany.

Other cyclodextrins may be used in combination or synergistically with alpha-cyclodextrin, such as beta-cyclodextrin and gamma-cyclodextrin, in particular ratios dependent upon the requirements of the manufacturer. In an exemplary embodiment, alpha-cyclodextrin may be used individually or may be combined with between 0-50% by weight beta-cyclodextrin or gamma-cyclodextrin and more preferably between 0.1 to about 40% by weight. Beta-cyclodextrins and gamma-cyclodextrins are also available from Wacker Specialties, Adrian, Mich. 49221.

EXAMPLE 1

In an exemplary embodiment of the present invention, a fat product, in this case a shortening, may be formulated. In this example, samples were prepared using about 5 to 20% of alpha-cyclodextrin by weight of the product.

| Shortening | |
|---|---|
| Ingredient | Weight Percentage |
| Oil* | 70% |
| Water | 13% |
| Alpha-cyclodextrin | 10% |
| Emulsifier** | 7% |

*Oil may be composed of, but not limited to: soybean oil, high-oleic sunflower oil, high-linoleic soybean oil, palm oil, palm kernel oil or coconut oil.
**Emulsifier may be composed of but not limited to: fully hydrogenated soybean oil mono-, di-, or tri-glyceride; mono-, di-, or tri-stearate.

This example was prepared by first hydrating the cyclodextrin in the water. The cyclodextrin-water mixture was added slowly to the oil-emulsifier mixture with constant stirring. The complete mixture is allowed to continue to stir for an additional 10 to 30 minutes to allow complete thickening of the shortening product.

The shortening produced in this example is reduced in caloric content by 23% relative to the oil-emulsifier mixture and contains no significant levels of trans fat. Additionally, this shortening will be stabilized against oxidation by the cyclodextrin. The consumer of this product will absorb less fat due to fat sequestration by cyclodextrin resulting in a product that is more hypocholesterolemic and hypotriglyceremic than the oil-emulsifier mixture.

The shortening product in this example may be votated in a continuous margarine cystallizer in order to achieve additional desirable texture characteristics.

In an exemplary embodiment of a food product utilizing the shortening product produced above, the shortening was utilized to produce a flaky roll product, such as marketed under the name GRANDS® available from General Mills, Inc., Minneapolis, Minn. 55426.

| Flaked Roll Product | |
|---|---|
| Ingredient | Weight Percentage |
| Hard Winter Wheat Flour | 49% |
| Water | 27% |
| Shortening | 18.5% |
| Soybean Oil | 2.2% |
| Vital Wheat Gluten | 1.3% |

| -continued | |
|---|---|
| Flaked Roll Product | |
| Ingredient | Weight Percentage |
| Sodium Bicarbonate | 1.0% |
| Salt | 1.0% |

EXAMPLE 2

In a still further exemplary embodiment of the present invention, a fat product, in this case shortening flakes, may be formulated. In this example, samples were prepared using about 15 to 50% of alpha-cyclodextrin by weight of the product.

| Shortening Flakes | |
|---|---|
| Ingredient | Weight Percentage |
| Oil* | 62% |
| Water** | 13% |
| Alpha-cyclodextrin | 15% |
| Emulsifier*** | 10% |

*Oil may be composed of, but not limited to: soybean oil, high-oleic sunflower oil, high-linoleic soybean oil, palm oil, palm kernel oil or coconut oil.
**Water may be removed from final product by freeze drying, dehydrating or evaporating the fat product.
***Emulsifier may be composed of but not limited to: fully hydrogenated soybean oil mono-, di-, or tri-glyceride; mono-, di-, or tri-stearate.

The shortening produced in accordance with the foregoing example is reduced in caloric content by 28% relative to the oil-emulsifier mixture and contains no significant levels of trans fat. Additionally, this shortening will be stabilized against oxidation by the cyclodextrin. The consumer of this product will absorb less fat due to fat sequestration by cyclodextrin resulting in a product that is more hypocholesterolemic and hypotriglyceremic than the oil-emulsifier mixture.

The shortening product produced in the foregoing example may be votated in a continuous margarine cystallizer in order to achieve additional desirable texture characteristics. Additionally, the shortening product may be processed through a commercial chipper/flaker to produce chipped and flaked fats.

In an exemplary embodiment of a food product utilizing the shortening flake product produced above was utilized to produce a buttermilk biscuit such as marketed under the name GRANDS® available from General Mills, Inc. Minneapolis, Minn. 55426.

| Buttermilk Biscuit Product | |
|---|---|
| Ingredient | Weight Percentage |
| Hard Spring Wheat Flour | 29.7% |
| Water | 27.86% |
| Soft Winter Wheat Flour | 18.7% |
| Shortening Flakes | 16.7% |
| Biscuit premix | 6.1% |
| Buttermilk solids | 0.94% |

The ingredients of an illustrative type of biscuit (premix, leavening agents, etc.) is shown in the following table.

| Ingredient | Weight % (Actual) | Weight % (Range) |
|---|---|---|
| Flour | 43.65 | 30-50 |
| Wheat Protein | 0.20 | .05-0.4 |
| Salt | 1.03 | .03-3.0 |
| Soda | 1.30 | 0.5-2.0 |
| SALP | 1.05 | 0.5-2.0 |
| SAPP | 0.60 | 0.1-1 |
| Sugar | 2.7 | 1-4 |
| Dough Conditioner | 0.80 | 0.2-2.0 |
| Butter Flavor | 0.10 | 0.01-2 |
| Caseinate | 0.90 | 0.05-1.5 |
| Soybean Oil | 0.07 | 0.01-2.0 |
| Shortening | 14.00 | 9.0-17.0 |
| Water | 33.60 | 28.45-39.45 |
| Total | 100.00 | |

In preparing each of the foregoing roll and biscuit products the following exemplary procedure was utilized.

A dough suitable for use with the present invention can be prepared by using one-stage mixing to combine the ingredients. One-stage mixing refers to the sequence in which the ingredients are combined. Initially, all dry ingredients are blended at a low speed ranging from about 20 to 40 rpm for about 30 seconds, prior to adding the liquid ingredients. The dry ingredients and liquid ingredients are then mixed for about 1.5 to 2 minutes on a low speed, until the ingredients are substantially uniformly integrated. Then the mixture is mixed at a high speed of approximately 40 to 80 rpm for about 3.5 minutes. This mixing sequence is effective to prevent the flour from hydrating and resulting in an overdeveloped dough.

After the dough is mixed, it can be transferred to a depositor or hopper for an extruder, and thereafter can be extruded through a die. For example, the dough can be placed into the hopper of a Vemag Extruder (Robert Reiser and company, Inc., Canton, Mass.), which extrudes the dough. An extrusion die plate can be attached to the extruder.

As the dough is being extruded, the dough is typically severed from the extruding stream which may be accomplished by any number of cutting devices, including blades, water knifes, ultrasonic cutters, wires, rotary cutters and like.

In an exemplary embodiment of a food product utilizing the shortening flake product produced above was utilized to produce a microwave popcorn product such as marketed under the name POPSECRET® available from General Mills, Inc. Minneapolis, Minn. 55426.

Especially popular for use with microwave popcorn is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids.

The oil slurry is prepared simply by admixing the oil (shortening) obtained in the examples above together with any optional ingredients such as salt and blending the mixture to form a stable dispersion or slurry. The slurry is then sprayed into the popcorn and the popcorn which is may then be deposited into a bag or alternatively, the slurry is sprayed into a bag where a charge of popcorn is already present.

The popcorn fat charge has the following composition:

| Ingredients | Weight % |
|---|---|
| Popcorn | 92.1 |
| Oil | 2.4 |
| Salt | 5.2 |
| Artificial butter flavor | 0.3 |
| | 100.0 |

Often and potentially more important than the actual manufacture or delivery of a product is communicating the benefits associated with a particular food product to the consumers. This can be done in a number of ways such as through the preparation of scripted information or indicia that is then released to consumers. The release of such indicia is usually tailored to certain pre-selected or predefined formats and can be done through traditional advertising routes that have at least an audio and or visual capability such as radio, television or over a global computer network, as well as through printed materials. The term printed materials may include the packaging into which the product is placed as well as newspapers, letters, direct mail pieces, magazines and the like.

It will thus be seen according to the present invention a highly advantageous food product or food intermediate having reduced trans fat levels and beneficial hypocholesterolemic and reduced caloric properties has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. An oil or fat-containing product having reduced trans fat levels, comprising;
   an oil or fat derived from grain, vegetable, or animal based components or combinations thereof; and
   an amount of a hydrated cyclodextrin ranging from 0.001% to 75% by weight of said oil or fat that is mixed with said fat or oil in an amount effective to increase the viscosity of the fat or oil to produce a thickened oil or fat-containing product for use in a food product or food intermediate.

2. An oil or fat-containing product as recited in claim 1, wherein said cyclodextrin is selected from a group including alpha-cyclodextrin, beta-cyclodextrin, gamma-cyclodextrin and combinations thereof.

3. An oil or fat-containing product as recited in claim 1, wherein said cyclodextrin is a chemically or enzymatically produced derivative of alpha-cyclodextrin, beta-cyclodextrin, gamma-cyclodextrin and combinations thereof.

4. An oil or fat-containing product as recited in claim 1, wherein said cyclodextrin is formed in or on the fat product by treatment with the enzyme, cyclodextrin glucosyltransferase (CGTase, EC 2.4.1.19) or a mutation or modification thereof.

5. An oil or fat-containing product as recited in claim 1, wherein said cyclodextrin is already present in the fat by expression of a gene encoding cyclodextrin glucosyltransferase (CGTase, EC 2.4.1.19) or a mutation or modification thereof.

6. An oil or fat-containing product as recited in claim 1, wherein said cyclodextrin is alpha-cyclodextrin.

7. An oil or fat-containing product as recited in claim 1, wherein said fat-containing product also has beneficial hypocholesterolemic properties.

8. An oil or fat-containing product as recited in claim 1, wherein said oil or fat-containing product is made from an oil or fat with triglycerides comprised of fatty acids with chain length of C2-C28 with unsaturation of zero to six double bonds on any given fatty acid chain.

9. An oil or fat-containing product as recited in claim 1, wherein said oil or fat-containing product comprises an emulsifier.

10. An oil or fat-containing product as recited in claim 1, wherein said oil or fat-containing product is made from an oil or fat with free fatty acids having chain length of C2-C28 with unsaturation of zero to six double bonds on any given fatty acid.

11. An food product or food intermediate comprising an oil or oil or fat-containing product as recited in claim 1, wherein said food product or food intermediate is selected from the group consisting of muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice cakes and corn cakes.

12. A shortening having reduced trans fat levels, comprising;
an oil or fat derived from grain, vegetable, or animal based components or combinations thereof; and
an amount of hydrated cyclodextrin ranging from 0.001% to 75% by weight of said fat or oil that is mixed with said fat or oil in an amount effective to increase the viscosity of the fat or oil to produce a shortening for use in a food product or food intermediate.

13. The shortening of claim 12, wherein said cyclodextrin is alpha-cyclodextrin.

14. A method for producing a fat-containing product having reduced trans fat levels comprising the steps of;
a) hydrating a cyclodextrin, selected from a group including alpha-cyclodextrin, beta-cyclodextrin, gamma-cyclodextrin and or combinations thereof;
b) mixing said cyclodextrin with a fat or oil in an amount effective to increase the viscosity of the fat or oil;
c) providing one or more ingredients useful in forming a fat or oil-containing product; and
d) producing said fat-containing product containing the ingredients of step b) and c).

15. A method as recited in claim 14, wherein said cyclodextrin is alpha-cyclodextrin.

16. A method as recited in claim 14, wherein said fat or oil-containing product is incorporated in a food product or food intermediate selected from the group consisting of muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice cakes and corn cakes.

17. A method as recited in claim 14, wherein said one or more ingredients includes a grain based ingredient.

18. A method as recited in claim 14, wherein said one or more ingredients includes a vegetable based ingredient.

19. A method as recited in claim 14, wherein said fat or oil-containing product is freeze dried, dehydrated, or evaporated to remove water.

20. A method as recited in claim 14, further comprising distributing said fat or oil-containing product or a food product containing said fat or oil-containing product for consumption.

* * * * *